(12) United States Patent
Ibrahim et al.

(10) Patent No.: US 11,537,498 B2
(45) Date of Patent: Dec. 27, 2022

(54) TECHNIQUES FOR DETECTING ATYPICAL EVENTS IN EVENT LOGS

(71) Applicant: Microsoft Technology Licensing, LLC, Redmond, WA (US)

(72) Inventors: Ziyad Ahmad Ibrahim, Sammamish, WA (US); Alexander Robert Paul Grenier, Seattle, WA (US); James David McCaffrey, Issaquah, WA (US); Dharmanshu Kamra, Seattle, WA (US); Sudhakar Visweswara Prabhu, Redmond, WA (US); Daniel James Carpenter, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 182 days.

(21) Appl. No.: 16/903,069

(22) Filed: Jun. 16, 2020

(65) Prior Publication Data
US 2021/0389997 A1   Dec. 16, 2021

(51) Int. Cl.
*G06F 11/00* (2006.01)
*G06F 11/34* (2006.01)
*G06F 9/54* (2006.01)
*G06F 21/57* (2013.01)
(Continued)

(52) U.S. Cl.
CPC .......... *G06F 11/3476* (2013.01); *G06F 9/542* (2013.01); *G06F 11/0766* (2013.01); *G06F 21/57* (2013.01); *G06K 9/6256* (2013.01); *G06F 2201/81* (2013.01); *G06F 2201/86* (2013.01)

(58) Field of Classification Search
CPC ............. G06F 11/3476; G06F 11/0766; G06F 11/0775; G06F 11/0781; G06F 11/079; G06F 11/3003; G06F 11/3006; G06F 11/3055; G06F 9/542; G06F 21/57; G06F 2201/81; G06F 2201/86; G06K 9/6256
See application file for complete search history.

(56) References Cited

U.S. PATENT DOCUMENTS

| 2017/0279840 A1 | 9/2017 | Zhang et al. |
| 2020/0076841 A1 | 3/2020 | Hajimirsadeghi et al. |
| 2020/0349470 A1* | 11/2020 | Ikeda ..................... G06N 3/088 |

(Continued)

FOREIGN PATENT DOCUMENTS

WO   2016191231 A1   12/2016

OTHER PUBLICATIONS

Nguyen, et al., "Autoencoders for Improving Quality of Process Event Logs", In Journal of Expert Systems with Applications, vol. 131, Oct. 1, 2019, pp. 132-147.

(Continued)

*Primary Examiner* — Joseph D Manoskey
(74) *Attorney, Agent, or Firm* — Jacob P. Rohwer; Newport IP, LLC

(57) ABSTRACT

Examples described herein generally relate to processing event logs where, for each of multiple events in an event log of the one or more event logs, a table of logged event instances can be generated for the event. For each of the multiple events, the table can be processed using an autoencoder to identify one or more of the logged event instances as anomalies, and an indication of at least a portion of the anomalies can be output. In addition, the event logs and/or corresponding tables of events can be used to train models for the autoencoders.

16 Claims, 6 Drawing Sheets

(51) Int. Cl.
*G06K 9/62* (2022.01)
*G06F 11/07* (2006.01)

(56) References Cited

U.S. PATENT DOCUMENTS

2021/0011832 A1\* 1/2021 Togawa ................. G06F 16/35
2021/0097385 A1\* 4/2021 Gupta ................. G06F 11/3452

OTHER PUBLICATIONS

"International Search Report and Written Opinion Issued in PCT Application No. PCT/US2021/028352", dated Aug. 2, 2021, 14 Pages.

\* cited by examiner

TECHNIQUES FOR DETECTING ATYPICAL EVENTS IN EVENT LOGS

BACKGROUND

Use of computing devices is becoming more ubiquitous by the day. Computing devices range from servers to standard desktop computers to gaming consoles to wearable computing technology to system on chip (SoC) devices and beyond. Computing devices execute various processes, including operating system services and applications, to provide desired functionality. The processes can log certain periodic or triggered events in an event log, which can be stored in a file or other construct in memory for subsequent telemetry evaluation, error detection, etc. In general, event logs are composed of series of textual events with coded values and are meant to be consumed by human to understand system activities and diagnose problems. Event logs are generally made of large number of events coming from the processors (e.g., or different components and modules thereof) authored by sometimes different engineers. For this reason, processing event logs can be a very laborious and time-consuming process. Moreover, for systems that are widely deployed, the amount of event log data can be massive and almost impossible to process by human in timely fashion.

Currently, event log processing techniques include identifying events based on deep domain knowledge. Some event log processing techniques may include algorithms crafted by a human with the deep domain knowledge to search for certain events using plain language of event parameters in the event log, certain event parameter values, etc. Other event log processing techniques may associate events based on a temporal correlation, where the desired events or identified correlation can be indicated or verified by the human with the deep domain knowledge.

SUMMARY

The following presents a simplified summary of one or more examples in order to provide a basic understanding of such examples. This summary is not an extensive overview of all contemplated examples, and is intended to neither identify key or critical elements of all examples nor delineate the scope of any or all examples. Its sole purpose is to present some concepts of one or more examples in a simplified form as a prelude to the more detailed description that is presented later.

In an example, a method for processing event logs is provided. The method includes obtaining one or more event logs generated by a process executing on one or more computing devices, generating, for each of multiple events in an event log of the one or more event logs, a table of logged event instances for the event, for each of the multiple events, processing the table using an autoencoder to identify one or more of the logged event instances as anomalies in the process, and outputting an indication of at least a portion of the anomalies in the process.

In another example, a computing device for processing event logs is provided that includes a memory storing one or more parameters or instructions for executing an operating system and one or more processes, and at least one processor coupled to the memory. The at least one processor is configured to obtain one or more event logs generated by a process executing on one or more computing devices, generate, for each of multiple events in an event log of the one or more event logs, a table of logged event instances for the event, for each of the multiple events, process the table using an autoencoder to identify one or more of the logged event instances as anomalies in the process, and output an indication of at least a portion of the anomalies in the process.

In another example, A non-transitory computer-readable medium including comprising code executable by one or more processors for processing event logs is provided. The code includes code for obtaining one or more event logs generated by a process executing on one or more computing devices, generating, for each of multiple events in an event log of the one or more event logs, a table of logged event instances for the event, for each of the multiple events, processing the table using an autoencoder to identify one or more of the logged event instances as anomalies in the process, and outputting an indication of at least a portion of the anomalies in the process.

To the accomplishment of the foregoing and related ends, the one or more examples comprise the features hereinafter fully described and particularly pointed out in the claims. The following description and the annexed drawings set forth in detail certain illustrative features of the one or more examples. These features are indicative, however, of but a few of the various ways in which the principles of various examples may be employed, and this description is intended to include all such examples and their equivalents.

DETAILED DESCRIPTION

Figure 1:
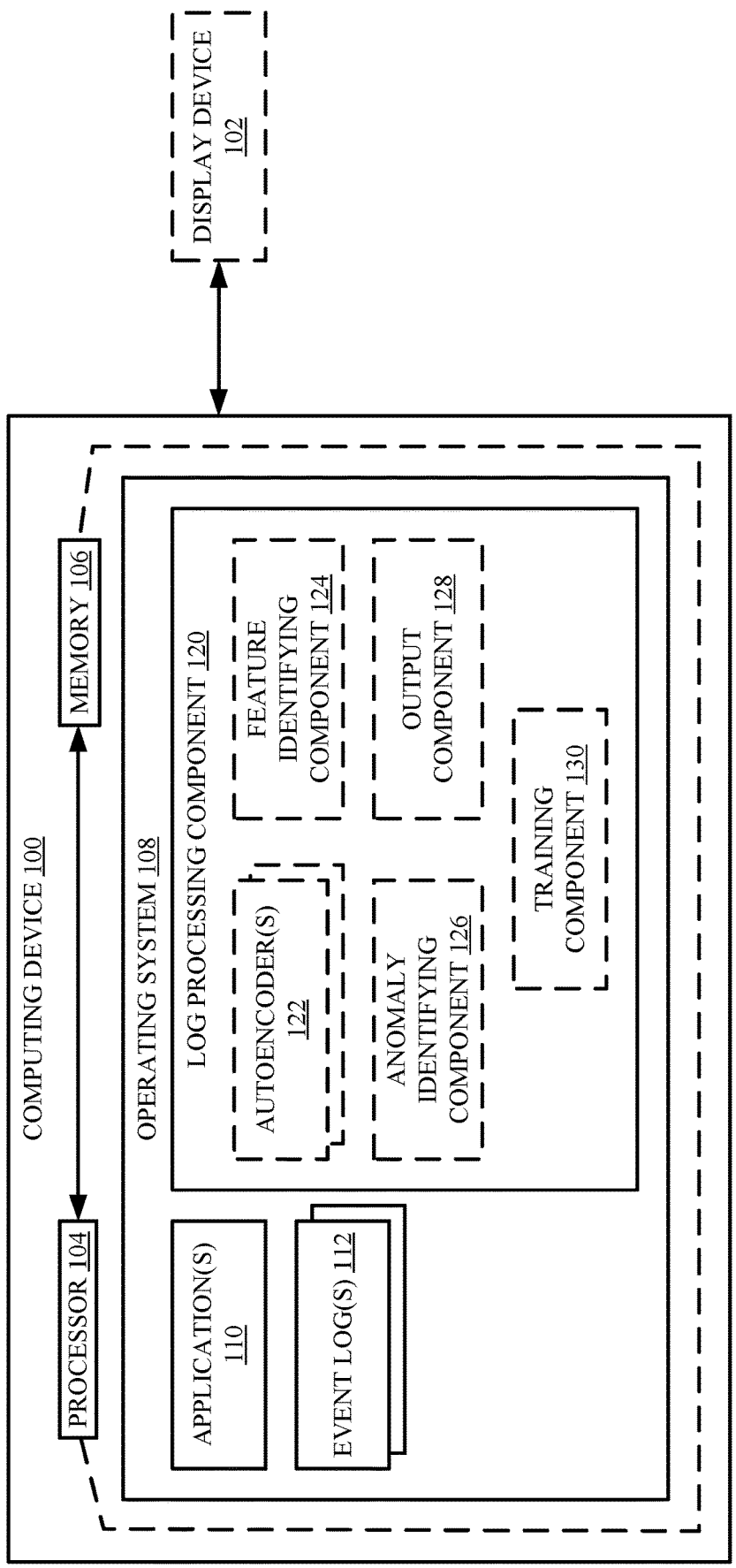
FIG. 1 is a schematic diagram of an example of a computing device for processing event logs, in accordance with examples described herein.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

Described herein are various examples related to detecting atypical events in event logs. In particular, an unsupervised learning technique is provided for detecting the atypical events, where the learning technique can include use of autoencoders. An autoencoder can include an artificial neural network that learns a representation for a set of data. The autoencoder can take the same input as its output, and in this regard can include an encoder that encodes input into a code, and a decoder that maps the code to the original input. Using an autoencoder in this regard can allow for detecting anomalies in data provided to the autoencoder.

For example, the unsupervised learning technique can be autonomously applied to a collection of multiple event logs to train a model for autoencoders for each type of event in the multiple event logs. The model can be trained based on one or more features for the type of event. In an example, the features for training the autoencoder can be determined using a feature identification process that evaluates key value pairs for the type of event in the multiple event logs to determine a numeric count of distinct values. The feature identification process can determine to use, as feature values, key value pairs having a numeric count of distinct values that is within a threshold numeric range. In an example, other key value pairs can be discarded from the model. The trained autoencoders can be applied to an event log to detect the atypical events having feature values detected as anomalies by the autoencoders.

In an example, the events that are detected as anomalies can be collected and output to a listing for review. This can provide an efficient issue detection or processing of event logs to determine possible issues based on the unsupervised analysis of the event logs. In another example, the events detects as anomalies can be used as a signature for the event log for clustering of the anomalies. This can allow for automated detection of event logs having similar anomalies, such that an issue causing the anomaly may be solved for one process without necessarily having to correct other processes or instances of the same process to which the event logs relate. This can also provide an efficient issue detection across multiple event logs and corresponding multiple processes or devices. In addition, where some log processing functions may look for patterns, using autoencoders in this regard may not require pattern analysis. The various aspects described herein can identify known and unknown problems in event logs without human intervention, can work with any multi-parameter event logs without the need to be fed with known patterns, and may not require expensive "labeled data" for training and, indeed, "unlabeled" data may be expected as input.

Figure 2:
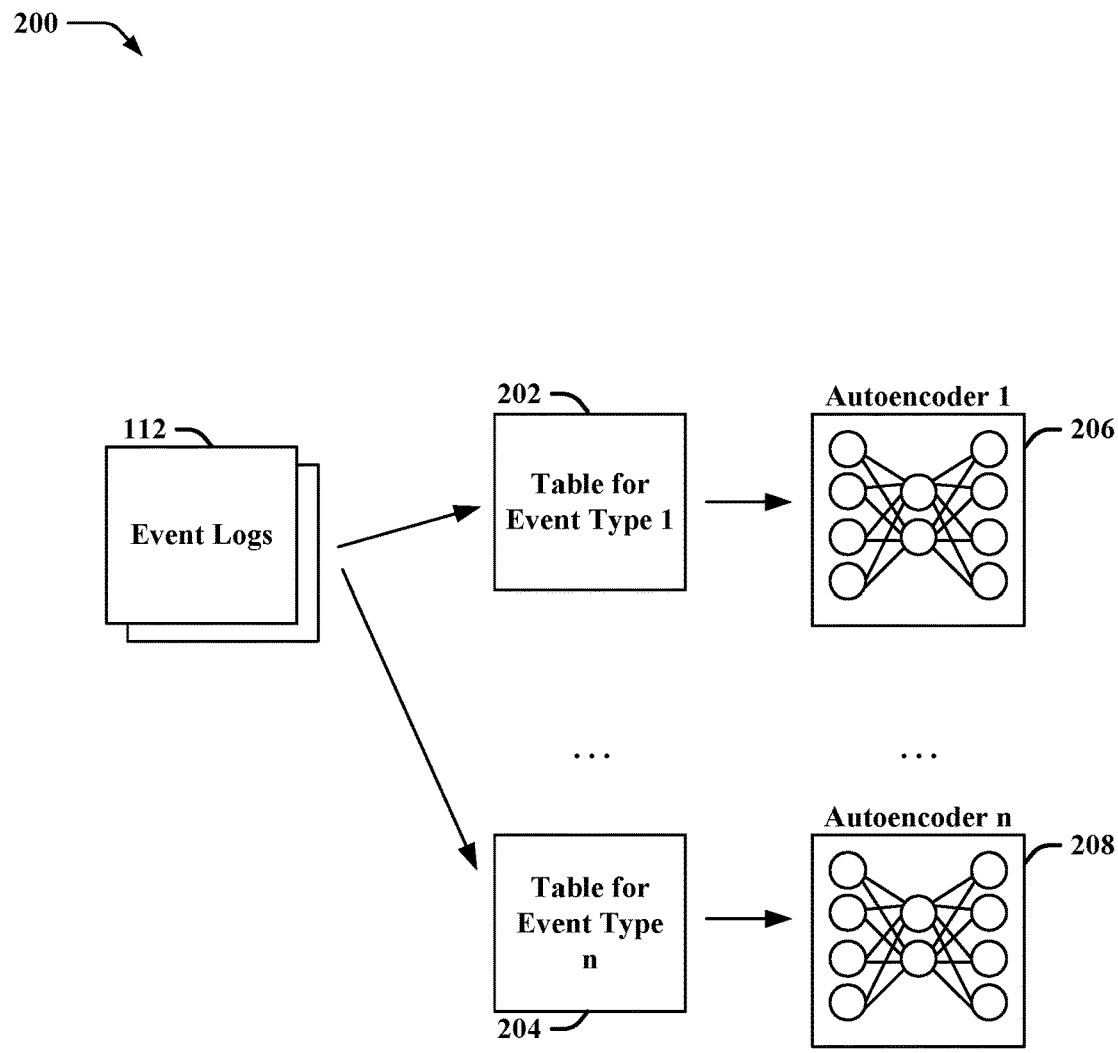
FIG. 2 illustrates a schematic diagram of an example of a data flow for generating tables of events for training corresponding autoencoders, in accordance with examples described herein.
Figure 3:
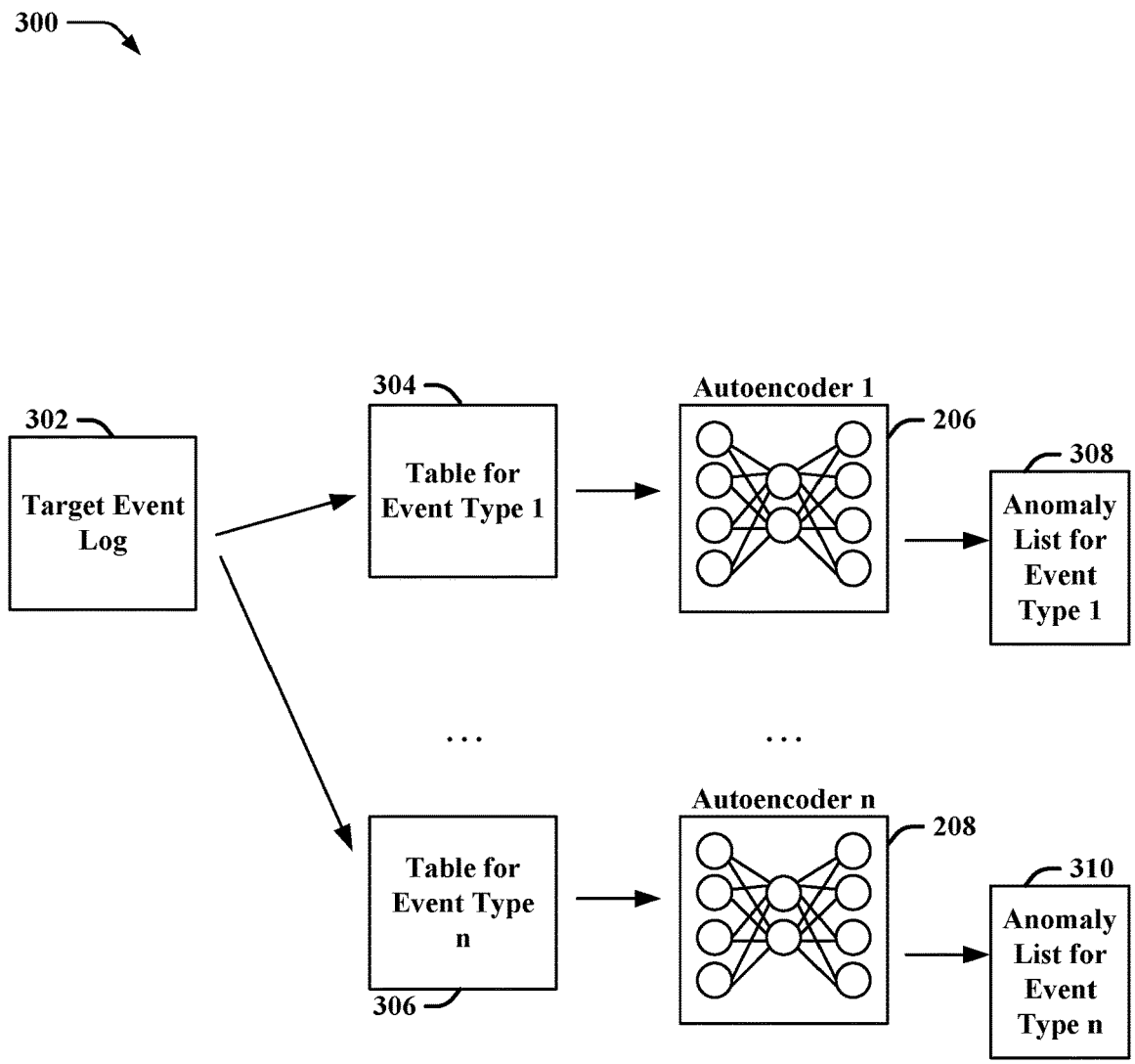
FIG. 3 illustrates a schematic diagram of an example of a data flow for processing tables of events of a target event log using corresponding trained autoencoders, in accordance with examples described herein.
Figure 4:
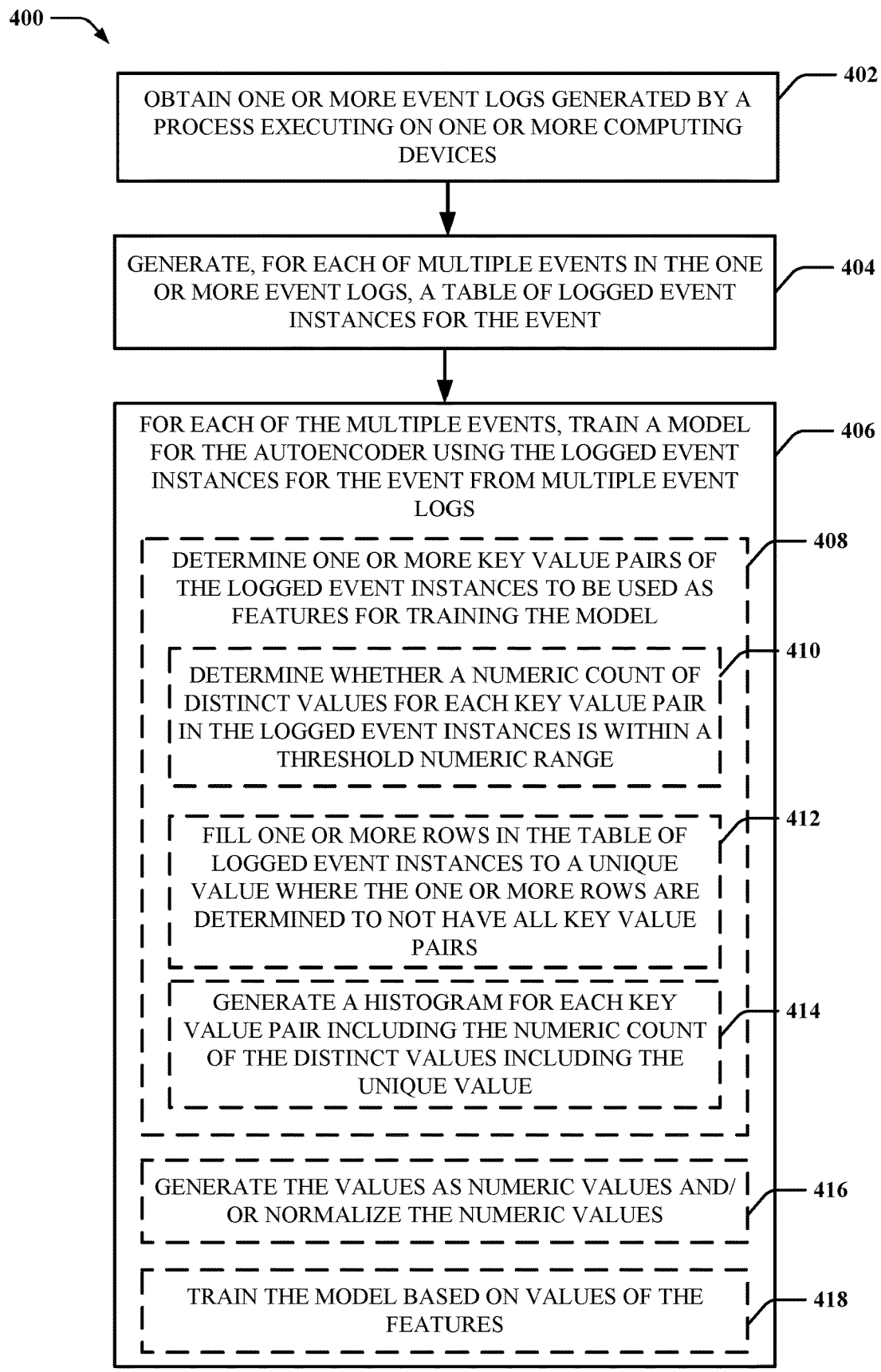
FIG. 4 is a flow diagram of an example of a method for training autoencoders for event log processing, in accordance with examples described herein.

Turning now to FIGS. 1-6, examples are depicted with reference to one or more components and one or more methods that may perform the actions or operations described herein, where components and/or actions/operations in dashed line may be optional. Although the operations described below in FIGS. 3-4 are presented in a particular order and/or as being performed by an example component, the ordering of the actions and the components performing the actions may be varied, in some examples, depending on the implementation. Moreover, in some examples, one or more of the following actions, functions, and/or described components may be performed by a specially-programmed processor, a processor executing specially-programmed software or computer-readable media, or by any other combination of a hardware component and/or a software component capable of performing the described actions or functions.

FIG. 1 is a schematic diagram of an example of a computing device 100 and related components for detecting atypical events in event logs in accordance with aspects described herein. In an example, computing device 100 may be coupled to an internal or remotely located display device 102 for providing an interface to facilitate operation with computing device 100, for selected event logs for processing, for displaying output related to identified atypical events in the event logs, etc. For example, computing device 100 can include or can otherwise be coupled with a processor 104 and/or memory 106, where the processor 104 and/or memory 106 can be configured to execute or store instructions or other parameters related to detecting atypical events in event logs, as described herein. Computing device 100 can execute an operating system 108 (e.g., via processor 104 and/or memory 106) for providing an environment for executing one or more applications 110, such as one or more applications, services, or other processes that can generate event logs 112. For example, event logs 112 can include a listing of events output by the one or more applications 110, which can be periodically output events, events output based on a detected trigger, etc.

For example, event logs 112 are typically composed of a series of textual events and coded values. Event logs 112 can be of substantially any format, and the format is typically determined by an author of the application 110 outputting the event log (or an author of a component of the application 110, such that one log may have events whose format is determined by different authors). In an example, the event log can include a collection of key value pairs, where each key can be a parameter of interest. For example, some parameters may include an identification of the application 110, an identification of a module within the application 110 outputting the event, various parameters and corresponding values related to the module and the event, a time/date stamp for the event, etc. In addition, for example, the application 110 may output events to the event log periodically (e.g., to allow for health status or other telemetric processes for the application 110), based on detecting an error or possible error (e.g., when a parameter value is greater than a maximum threshold or less than a minimum threshold, etc.), and/or the like. Event logs can be voluminous with much of the data being not of interest at least for the purpose of identifying possible issues with the application 110.

In this regard, for example, computing device 100 may include a log processing component 120 that can process one or more event log(s) 112 to determine atypical events existing in the one or more event log(s) 112. As described herein, log processing component 120 can perform unsupervised analysis of the event log(s) 112 based on a learning technique to detect the atypical events and/or to cluster logs having similar atypical events. In an example, log processing component 120 can include multiple autoencoders 122 that can be instantiated for each event type in the event log(s) 112, a feature identifying component 124 for identifying one or more features of the events to train the autoencoders 122 and/or for applying the autoencoders 122 to detect atypical events, an anomaly identifying component 126 for identifying anomalies in the event log(s) 112 based on autoencoder 122 output, an output component 128 for outputting information related to the anomalies, and/or a training component 130 for training the autoencoders 122 based on multiple event logs 112.

FIG. 2 illustrates an example of a data flow 200 for training autoencoders to process event logs 112. In data flow 200, multiple event logs 112 can be obtained from a process (e.g., application 110) executing on one or more computing devices. The event logs 112 can each include output of multiple events from the process, which can include multiple types of events, which can each have its own format of key value pairs, etc. For example, log processing component 120 can identify different event types in the event logs 112, which can be based on detecting one or more key pair values that indicate the event type (e.g., a module, handler identifier, etc.) and can create a table of event instances for the event type, including table 202 for event type 1, table 204 for event type n, etc., where each table can include rows corresponding to the logged event instances and each column can include key value pairs for parameters of the event instances. For each event type, log processing component 120 can instantiate or train an autoencoder 122, such as autoencoder 1 206 for event type 1, autoencoder n 208 for event type n, etc., based on the corresponding event tables.

For example, as described further herein, training component 130 can train the autoencoders 122 for each event type by determining key value pairs in the event to be used as features, converting features into numeric values, normalizing or standardizing the numeric values, and/or building a deep neural network autoencoder model based on the number of features. In one example, feature identifying component 124 can identify the features for training the model using a feature identification process that can include determining key value pairs as features based on determining that a numeric count of distinct values over all values presented in multiple event logs is within a threshold numeric range.

FIG. 3 illustrates an example of a data flow 300 for using trained autoencoders to process a target event log 302. In data flow 300, target event log 302 can be obtained from a process (e.g., application 110) executing on one or more computing devices, and the data flow 300 can, in one example, be executed for each of multiple event logs 112 (e.g., after or in conjunction with training the autoencoders 122). The target event log 302 can include output of multiple events from the process, which can include multiple types of events, which can each have its own format of key value pairs, etc. For example, log processing component 120 can identify different event types in the target event log 302 (which can be the same as or based on determining the types of events in multiple event logs 112, as described above in conjunction with data flow 200). In this example, log processing component 120 can similarly create a table of event instances for the event type, including table 304 for event type 1, table 306 for event type n, etc., where each table can include rows corresponding to the logged event instances and each column can include key value pairs for parameters of the event instances. For each event type, log processing component 120 can process the event by applying the corresponding trained autoencoder 122, such as autoencoder 1 206 for event type 1, autoencoder n 208 for event type n, etc., to the corresponding event tables. In this regard, the autoencoders 122 can output anomalies in the event data (e.g., autoencoder 1 206 can output anomaly list 308 for event type 1, autoencoder n 208 can output anomaly list 310 for event type n, etc.).

FIG. 4 is a flowchart of an example of a method 400 for training a model for an autoencoder based on event data from event logs. For example, method 400 can be performed by a computing device 100 and/or one or more components thereof, such as a log processing component 120, feature identifying component 124, training component 130, etc., and is accordingly described with reference to FIGS. 1 and 2, for example.

In method 400, at action 402, one or more event logs generated by a process executing one or more computing devices can be obtained. In an example, log processing component 120, e.g., in conjunction with processor 104, memory 106, operating system 108, etc., can obtain the one or more event logs 112 generated by the process executing on one or more computing devices. For example, the process can be an application 110 or other service or process executing on computing device 100 and can generate the one or more event logs 112 on the computing device 100. In another example, the process can additionally or alternatively execute on one or more other computing devices, such that the multiple event logs 112 can each correspond to an execution of the process on one or more different computing devices. In an example, log processing component 120 can obtain the one or more event logs via an interface provided for indicating event logs to be processed or otherwise to be used to train autoencoders. In another example, log processing component 120 can obtain the one or more event logs based on monitoring a location for new event logs to be processed. Moreover, log processing component 120 can obtain the one or more event logs from a bug database or log files directed obtained from systems. Log processing component 120 may or may not also obtain bug reports associated with the event logs to assist in detecting known errors.

In method 400, at action 404, for each of multiple events in the one or more event logs, a table of logged event instances can be generated for the event. In an example, log processing component 120, e.g., in conjunction with processor 104, memory 106, operating system 108, etc., can generate, for each of the multiple events in the one or more event logs 112, the table of logged event instances for the event (e.g., tables 202, 204). For example, log processing component 120 can generate the table for each event for which there are multiple event instances. The event is also referred to herein as an event type, and each event can correspond to a line in the event logs 112. In an example, log processing component 120 can determine the event for which to generate the table having the multiple logged event instances based on one or more parameters that identify the event in the one or more event logs. For example, the one or more parameter that identify the event may include an event identifier, which may include a provider name, and an event name (e.g., which may include a function name within a module, a variable name, a notification, etc.), a process or module identifier, an instruction line number, a handler, etc. In one example, the provider name can be specific to the operating system, such that no two components or modules within the operating system have the same provider name. A component or module may include an executable, a dynamic link library process, a service, or substantially any binary of the operating system. This can result in the Event Name being a unique ID value. Moreover, for example, log processing component 120 can generate the table having columns corresponding to key value pairs of the event, and rows corresponding to each event instance, such that the cells in a given row correspond to the values of the key value pairs for a given event instance.

In method 400, at action 406, for each of the multiple events, a model for the autoencoder can be trained using the logged event instances for the event from the multiple event logs. In an example, training component 130, e.g., in conjunction with processor 104, memory 106, operating system 108, log processing component 120, etc., can, for each of the multiple events, train the model for the autoencoder (e.g., autoencoder(s) 122) using the logged event instances for the event from the multiple event logs 112. The trained autoencoders 122 can be used for applying to a target event log to detect atypical events for one or more of the event types.

In an example, in training the model at action 406, optionally at action 408, one or more key value pairs of the logged event instances to be used as features for training the model can be determined. In an example, feature identifying component 124, e.g., in conjunction with processor 104, memory 106, operating system 108, log processing component 120, etc., can determine the one or more key value pairs of the logged event instances to be used as features for training the model. As described, each event may have multiple key value pairs in the event logs 112 for providing various information. In an example, without guidance or knowledge of the event log purpose or format, feature identifying component 124 can identify which key value pairs are to be used as features. The features can be the values of the logged event instances that are modeled and then checked in a target event log to detect atypical values for reporting or otherwise outputting. For example, certain key value pairs may not be important for issue detection, such as an identifier (e.g., globally unique identifier (GUID), thread identifier, etc.). One way to assume that a feature may be relevant for determining atypical values is based on the number of distinct values for the key value pair in the various events of the multiple event logs 112.

Thus, in an example, in determining the features at action 408, optionally at action 410, it can be determined whether a numeric count of distinct values for each key value pair in the logged event instances is within a threshold numeric range. In an example, feature identifying component 124, e.g., in conjunction with processor 104, memory 106, operating system 108, log processing component 120, etc., can determine whether the numeric count of distinct values for each key value pair in the logged event instances is within a threshold numeric range. For example, feature identifying component 124 can parse through the event logs 112 and can increment a count of distinct values for the key value pair each time a new value for the key value pair for the given event type is encountered. Feature identifying component 124 can determine features as the key value pairs within a threshold numeric range (e.g., 16-128 values in a very specific non-limiting example). For example, key value pairs having a number of distinct values below a minimum of the threshold numeric range may not be considered to have enough variation to be important for detecting atypical events, and key value pairs having a number of distinct values above a maximum of the threshold numeric range may be considered too volatile to measure for determining atypical events (and indeed, the autoencoder 122 may not be able to effectively model a feature with too many distinct values). Key value pairs that are not considered as features can be ignored and/or can be removed from the event table used to train the autoencoder 122.

In addition, in an example, in determining the features at action 408, optionally at action 412, one or more rows in the table of logged event instances can be filled to a unique value where the one or more rows are determined to not have all key value pairs. In an example, feature identifying component 124, e.g., in conjunction with processor 104, memory 106, operating system 108, log processing component 120, etc., can fill the one or more rows in the table of logged event instances to the unique value where the one or more rows are determined to not have all key value pairs. For example, feature identifying component 124 can fill the one or more rows with the unique value, such as "NoData." Feature identifying component 124 can then count the number of distinct values for each key value pair, including the unique value, as described above.

Moreover, in an example, in counting the number of distinct values, optionally at action 414, a histogram for each key value pair can be generated including the numeric count of the distinct values including the unique value. In an example, feature identifying component 124, e.g., in conjunction with processor 104, memory 106, operating system 108, log processing component 120, etc., can generate the histogram for each key value pair including the numeric count of the distinct values including the unique value. If the number of distinct values in the column of the key value pair are within threshold numeric range, as indicated by the histogram, the key value pair can be considered as a feature (and can be kept in the table). Other key value pairs can be removed as columns from the table.

In an example, in training the model at action 406, optionally at action 416, the values can be generated as numeric values and/or the numeric values can be normalized. In an example, training component 130, e.g., in conjunction with processor 104, memory 106, operating system 108, log processing component 120, etc., can generate the values as numeric values and/or can normalize the numeric values. For example, training component 130 can convert the values using one hot encoding, which can assign a bit to each distinct value for a given feature. In an example, one-hot encoding, also known as 1-of-N encoding, can assign a vector to each distinct item in a set of N items. For example, if N=3 and the source set is (red, blue, green) then one possible one-hot encoding of the set is red=(1, 0, 0), blue=(0, 1, 0), green=(0, 0, 1). In addition, for example, training component 130 can normalize the numeric values to generate a more simplified or sequential set of values for training the model. In any case, using the numeric and/or normalized values can simplify training the model for the autoencoder 122. In an example, optionally at action 418, the model can be trained based on values of the features. In an example, training component 130, e.g., in conjunction with processor 104, memory 106, operating system 108, log processing component 120, etc., can train the model based on values of the features. This can include training the model based on the numeric values for the features. In any case, training component 130 can build a deep neural network autoencoder model for use in identifying atypical event values in a target event log, as described above and further herein.

For example, referring to FIG. 2, training component 130 can train autoencoder 1 206 based on event table 202 for event type 1, where event table 202 can include normalized numeric feature values for certain key pairs for logged event instances of event type 1 from multiple event logs 112, as described. Similarly, for example, training component 130 can train additional autoencoders (e.g., an autoencoder per event table), up to autoencoder n 208 based on event table 204 for event type n, where event table 204 can include normalized numeric feature values for certain key pairs for logged event instances of event type n from multiple event logs 112, as described.

Figure 5:
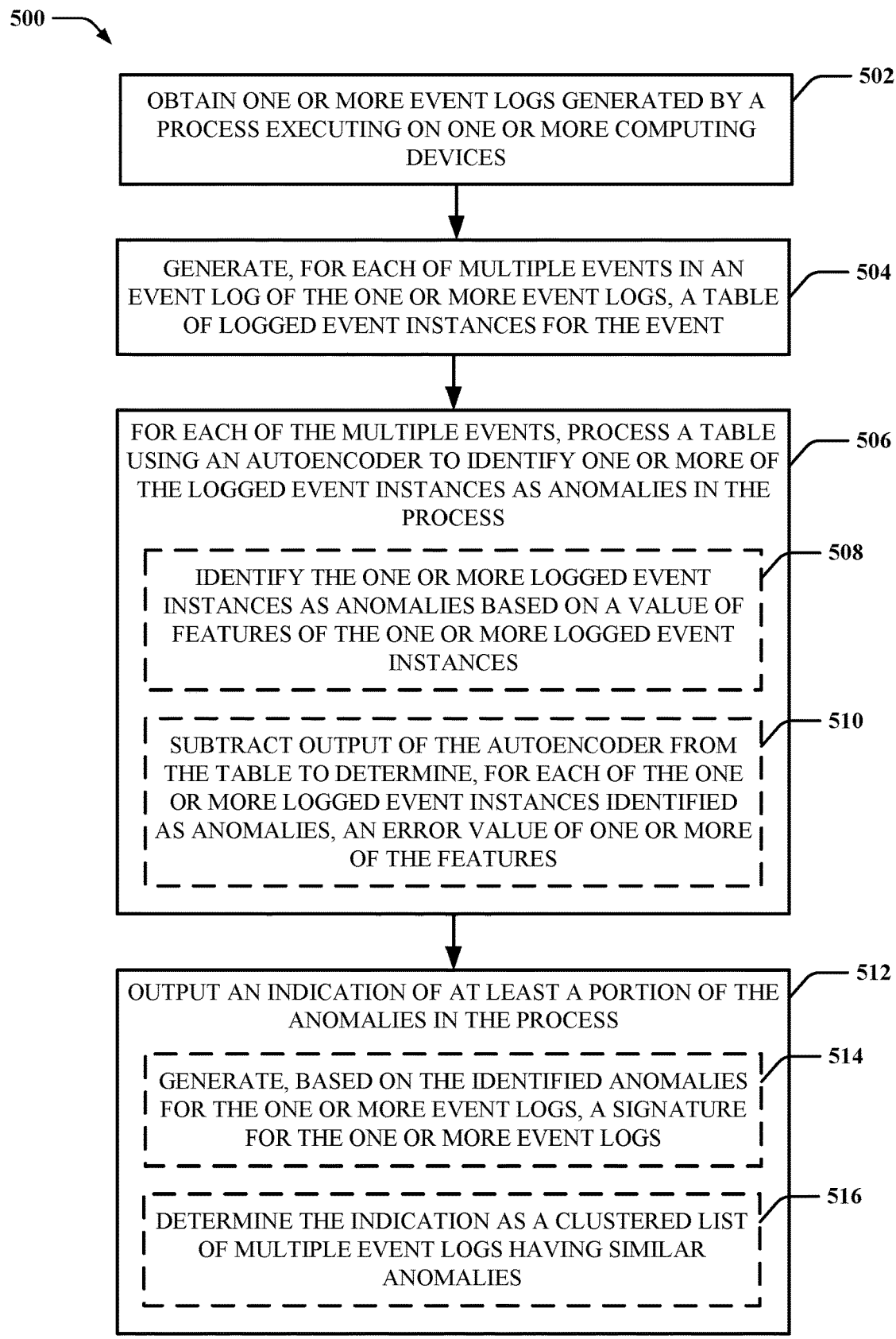
FIG. 5 is a flow diagram of an example of a method for event log processing using trained autoencoders, in accordance with examples described herein.

FIG. 5 is a flowchart of an example of a method 500 for detecting atypical events in an event log. For example, method 500 can be performed by a computing device 100 and/or one or more components thereof, such as a log processing component 120, feature identifying component 124, anomaly identifying component 126, output component 128, etc., and is accordingly described with reference to FIGS. 1 and 3, for example.

In method 500, at action 502, one or more event logs generated by a process executing one or more computing devices can be obtained. In an example, log processing component 120, e.g., in conjunction with processor 104, memory 106, operating system 108, etc., can obtain the one or more event logs 112 generated by the process executing on one or more computing devices. For example, log processing component 120 can obtain the one or more event logs as described above in reference to action 402 of method

400. The one or more event logs in this example can include a target event log 302. In one example, after training the model based on multiple event logs 112, log processing component 120 can attempt to detect atypical events in each of the multiple event logs 112 or in a portion thereof or in a different event log, etc., as the target event log 302.

In method 500, at action 504, for each of multiple events in the one or more event logs, a table of logged event instances can be generated for the event. In an example, log processing component 120, e.g., in conjunction with processor 104, memory 106, operating system 108, etc., can generate, for each of the multiple events in the one or more event logs 112, the table of logged event instances for the event (e.g., tables 304, 306). For example, log processing component 120 can generate the table for each event for which there are multiple event instances in the target event log(s). The event is also referred to herein as an event type, and each event can correspond to a line in the target event log(s), as described above in action 404 of method 400. In this regard, for example, log processing component 120 can generate the table having columns corresponding to key value pairs of the event, and rows corresponding to each event instance, such that the cells in a given row correspond to the values of the key value pairs for a given event instance.

In method 500, at action 506, for each of the multiple events, a table can be processed using an autoencoder to identify one or more of the logged event instances as anomalies in the process. In an example, anomaly identifying component 126, e.g., in conjunction with processor 104, memory 106, operating system 108, log processing component 120, etc., can, for each of the multiple events, process the table using the autoencoder to identify one or more of the logged event instances as anomalies in the process. For example, referring to FIG. 3, anomaly identifying component 126 can process event table 304 for event type 1 using autoencoder 1 206, which can be trained as described above, and can similarly use additional autoencoders to process other event types, such as autoencoder n 208 to process event table 306 for event type n. In one example, the autoencoders 122 can be trained using the multiple event logs that can include the target event log or can be trained using random entries from the multiple event logs or other event logs. In this example, as autoencoder 1 206 identifies anomalies, it can output information regarding the event instance having the anomaly to an anomaly list 308 for event type 1. Similarly, for example, as autoencoder n 208 identifies anomalies, it can output information regarding the event instance having the anomaly to an anomaly list 310 for event type n, etc.

For example, in processing the table at action 506, optionally at action 508, the one or more logged event instances can be identified as anomalies based on a value of features of the one or more logged event instances. In an example, anomaly identifying component 126, e.g., in conjunction with processor 104, memory 106, operating system 108, log processing component 120, etc., can identify the one or more logged event instances as anomalies based on a value of features of the one or more logged event instances. In an example, feature identifying component 124 can similarly identify the features for the event type, as described above in action 408 of FIG. 4. For example, feature identifying component 124 can identify the features for the event type for a given target event log, or can use the same features determined in previously training the autoencoder 122 for the event type. Moreover, and in this regard, feature identifying component 124 may similarly remove columns from the event table for the target event log that are not determined as features. In any case, for example, anomaly identifying component 126 can identify anomalies in the logged event instances where a feature is determined by the autoencoder 122 as an anomaly. For example, autoencoder 122 can determine that the value of the feature is not consistent with values trained from event instances in multiple event logs, as described above, where the determination can be based on artificial intelligence or other machine learning algorithms based on the deep neural network formed by training the autoencoder 122.

For example, in processing the table at action 506, optionally at action 510, output of the autoencoder can be subtracted from the table to determine, for each of the one or more logged event instances identified as anomalies, an error value of one or more of the features. In an example, anomaly identifying component 126, e.g., in conjunction with processor 104, memory 106, operating system 108, log processing component 120, etc., can subtract the output of the autoencoder 122 from the table (e.g., the input to the autoencoder 122) to determine, for each of the one or more logged event instances identified as anomalies, an error value of one or more of the features. For example, neural network input and output values can be n-dimensional numeric vectors. Because the input and output vectors of an autoencoder both have the same dimension, it is possible to compute a reconstruction error as the vector difference between input and output using Euclidean distance or other distance metric. Moreover, for example, the error value can represent an amount of the error (e.g., a deviation from expected values). In one example, the error value can be included in the anomaly lists 308, 310 as well.

Moreover, in an example, anomaly identifying component 126 can sort the resulting table, generated by subtracting the autoencoder output from the input table, by error value with the highest error first and the lowest error last. In this example, anomaly identifying component 126 can select a first highest number of entries from the resulting table (e.g., a number N of entries), which can be added to the anomaly lists 308, 310. After finishing all the event tables, each log can have an associated list of anomalies (which may also be used as a log signature, as described further herein). Some of the logs may have an empty list, and may not be processed further as no atypical events were identified.

In method 500, at action 512, an indication of at least a portion of the anomalies in the process can be output. In an example, output component 128, e.g., in conjunction with processor 104, memory 106, operating system 108, log processing component 120, etc., can output an indication of at least a portion of the anomalies in the process. For example, output component 128 can output an indication of anomalies in the target event log and/or in one or more of the multiple logs identified as having an anomaly, where the anomaly can indicate the atypical event value. In one example, output component 128 can output an indication of the event log having the anomaly and/or an indication of the anomaly. In this example, output component 128 can display, on an interface on a display device, an indication of the event log, such as an event log name or other identifier, along with the indication of the anomaly as an indicated parameter value, which may be highlighted (e.g., in different color text, bold text, underlined text, highlighted text, etc.) to facilitate simplified identification of the anomaly or atypical event or related feature value.

In one example, output component 128 can sort a list of anomalies (e.g., anomaly lists 308, 310, or a combined anomaly list of all anomalies for all events in the target event log) by error value to output the anomalies with the largest error first, as described. In an example, output component 128 can add the list of anomalies to a bug database or other table or file, log, etc. to allow for human processing of the list to determine a source of the atypical events.

In another example, in outputting the indication at action 512, optionally at action 514, a signature for the one or more event logs can be generated based on the identified anomalies for the one or more event logs. In an example, output component 128, e.g., in conjunction with processor 104, memory 106, operating system 108, log processing component 120, etc., can generate, based on the identified anomalies for the one or more event logs, the signature for the one or more event logs. For example, output component 128 can generate the signature as an encoded representation of the anomaly list for the event log (e.g., for combined anomaly lists for all events in the event log), such that target event logs having the same anomaly list can have the same signature. This can allow for clustering of the event logs to simplify atypical event identification across multiple event logs.

For example, in outputting the indication at action 512, optionally at action 516, the indication can be determined as a clustered list of multiple event logs having similar anomalies. In an example, output component 128, e.g., in conjunction with processor 104, memory 106, operating system 108, log processing component 120, etc., can determine the indication as the clustered list of multiple event logs having similar anomalies. For example, output component 128 can determine multiple event logs having the same or similar signatures, and can indicate a list of the event logs to allow for simplified atypical event detection across event logs. For example, output component 128 can cluster event logs with identical anomaly list first and build the first cluster group. Then output component 128, in an example, can gradually build cluster list for event logs that share some of the anomaly events, and/or finally build the cluster list that only share one anomaly. Output component 128 can display the list(s) on an interface (e.g., on a display device, etc.) for human processing.

Figure 6:
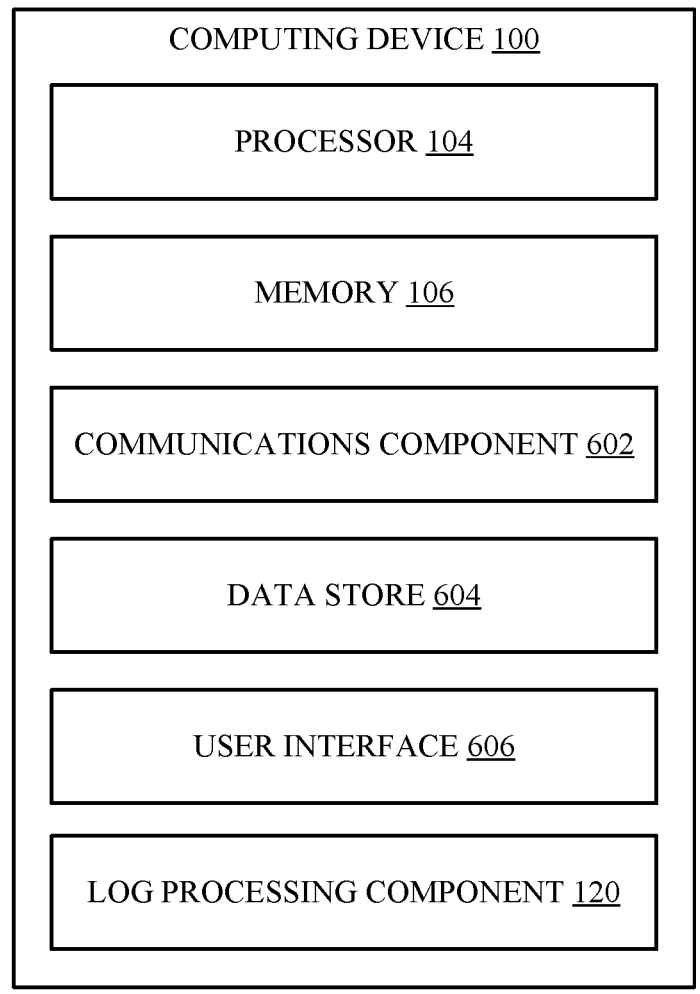
FIG. 6 is a schematic diagram of an example of a computing device for performing functions described herein.

FIG. 6 illustrates an example of computing device 100 including additional optional component details as those shown in FIG. 1. In one example, computing device 100 may include processor 104 for carrying out processing functions associated with one or more of components and functions described herein. Processor 104 can include a single or multiple set of processors or multi-core processors. Moreover, processor 104 can be implemented as an integrated processing system and/or a distributed processing system.

Computing device 100 may further include memory 106, such as for storing local versions of applications being executed by processor 104, related instructions, parameters, etc. Memory 106 can include a type of memory usable by a computer, such as random access memory (RAM), read only memory (ROM), tapes, magnetic discs, optical discs, volatile memory, non-volatile memory, and any combination thereof. Additionally, processor 104 and memory 106 may include and execute an operating system executing on processor 104, one or more applications (e.g., application 110), display drivers, services, etc., as described herein, and/or other components of the computing device 100.

Further, computing device 100 may include a communications component 602 that provides for establishing and maintaining communications with one or more other devices, parties, entities, etc. utilizing hardware, software, and services as described herein. Communications component 602 may carry communications between components on computing device 100, as well as between computing device 100 and external devices, such as devices located across a communications network and/or devices serially or locally connected to computing device 100. For example, communications component 602 may include one or more buses, and may further include transmit chain components and receive chain components associated with a wireless or wired transmitter and receiver, respectively, operable for interfacing with external devices.

Additionally, computing device 100 may include a data store 604, which can be any suitable combination of hardware and/or software, that provides for mass storage of information, databases, and programs employed in connection with examples described herein. For example, data store 604 may be or may include a data repository for applications and/or related parameters not currently being executed by processor 104. In addition, data store 604 may be a data repository for an operating system, application, display driver, etc. executing on the processor 104, and/or one or more other components of the computing device 100.

Computing device 100 may also include a user interface component 606 operable to receive inputs from a user of computing device 100 and further operable to generate outputs for presentation to the user (e.g., via display interface 116 to a display device). User interface component 606 may include one or more input devices, including but not limited to a keyboard, a number pad, a mouse, a touch-sensitive display, a navigation key, a function key, a microphone, a voice recognition component, a gesture recognition component, a depth sensor, a gaze tracking sensor, any other mechanism capable of receiving an input from a user, or any combination thereof. Further, user interface component 606 may include one or more output devices, including but not limited to a display interface, a speaker, a haptic feedback mechanism, a printer, any other mechanism capable of presenting an output to a user (e.g., an output of detected atypical events or corresponding logs), or any combination thereof.

Computing device 100 can also include a log processing component 120 for processing one or more event logs, training autoencoders for processing the event logs to detect atypical events, etc., as described herein.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more examples, one or more of the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), and floppy disk where disks usually reproduce data magnetically, while discs reproduce data optically with lasers. Combinations of the above should also be included within the scope of computer-readable media.

The previous description is provided to enable any person skilled in the art to practice the various examples described herein. Various modifications to these examples will be readily apparent to those skilled in the art, and the generic principles defined herein may be applied to other examples. Thus, the claims are not intended to be limited to the examples shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various examples described herein that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A computer-implemented method for processing event logs, comprising:
    obtaining one or more event logs generated by a process executing on one or more computing devices;
    for each event of multiple events in the one or more event logs:
        generating a table of logged event instances for the event, wherein each logged event instance includes a value for a parameter, wherein the parameter is a feature for anomaly detection based on a numeric count of distinct values for the parameter being within a threshold numeric range;
        identifying a logged event instance as an anomaly in the process by processing the table using an autoencoder, the identifying being based on the value for the parameter in the logged event instance; and
        outputting an indication of the anomaly in the process.

2. The computer-implemented method of claim 1, further comprising training a model for the autoencoder using the logged event instance that includes the value for the parameter.

3. The computer-implemented method of claim 2, wherein training the model for the autoencoder using the logged event instance that includes the value for the parameter includes at least one of generating the value as a numeric value and/or normalizing the numeric value.

4. The computer-implemented method of claim 2, wherein the autoencoder identifies the logged event instance as the anomaly based on subtracting output of the autoencoder from the table to determine an error value for the parameter.

5. The computer-implemented method of claim 1, further comprising identifying the parameter for anomaly detection based on the numeric count of distinct values for the parameter being within the threshold numeric range.

6. The computer-implemented method of claim 5, wherein the identifying includes:
    generating a histogram for the numeric count of distinct values for the parameter; and
    determining that the numeric count of distinct values for the parameter is within the threshold numeric range is based on the histogram.

7. The computer-implemented method of claim 1, wherein the indication includes information for locating the anomaly in the one or more event logs.

8. The computer-implemented method of claim 1, further comprising generating, based on the anomaly, a signature for the one or more event logs.

9. A computing device for processing event logs, comprising:
    a memory storing one or more parameters or instructions for executing an operating system and one or more processes; and
    at least one processor coupled to the memory, wherein the at least one processor is configured to:
        obtain one or more event logs generated by a process executing on the computing device;
        for each event of multiple events in the one or more event logs:
            generate a table of logged event instances for the event, wherein each logged event instance includes a value for a parameter, wherein the parameter is a feature for anomaly detection based on a numeric count of distinct values for the parameter being within a threshold numeric range;
            identify a logged event instance as an anomaly in the process by processing the table using a trained autoencoder, the identifying being based on the value for the parameter in the logged event instance; and
            output an indication of the anomaly in the process.

10. The computing device of claim 9, wherein the trained autoencoder identifies the logged event instance as the anomaly based on subtracting output of the trained autoencoder from the table to determine an error value for the parameter.

11. The computing device of claim 9, wherein the at least one processor is configured to identify the parameter for anomaly detection based on the numeric count of distinct values for the parameter being within the threshold numeric range.

12. The computing device of claim 11, wherein the at least one processor is configured to:
    generate a histogram for the numeric count of distinct values for the parameter; and
    determine that the numeric count of distinct values for the parameter is within the threshold numeric range based on the histogram.

13. The computing device of claim 9, wherein the indication includes information for locating the anomaly in the one or more event logs.

14. The computing device of claim 9, the at least one processor is further configured to generate, based on the anomaly, a signature for the one or more event logs.

15. A non-transitory computer-readable medium, comprising code executable by one or more processors for processing event logs, the code comprising code for:

obtaining one or more event logs generated by a process executing on one or more computing devices;

for each event of multiple events in the one or more event logs:

generating a table of logged event instances for the event, wherein each logged event instance includes a value for a parameter, wherein the parameter is a feature for anomaly detection based on a numeric count of distinct values for the parameter being within a threshold numeric range;

identifying a logged event instance as an anomaly in the process by processing the table using an autoencoder, the identifying being based on the value for the parameter in the logged event instance; and outputting an indication of the anomaly in the process.

16. The non-transitory computer-readable medium of claim 15, further comprising code for training a model for the autoencoder using the logged event instance that includes the value for the parameter.

* * * * *